(12) United States Patent
Saitou

(10) Patent No.: US 9,557,617 B2
(45) Date of Patent: Jan. 31, 2017

(54) DISPLAY DEVICE

(71) Applicant: Japan Display Inc., Tokyo (JP)

(72) Inventor: Tomokazu Saitou, Tokyo (JP)

(73) Assignee: Japan Display Inc., Tokyo (JP)

( * ) Notice: Subject to any disclaimer, the term of this patent is extended or adjusted under 35 U.S.C. 154(b) by 206 days.

(21) Appl. No.: 14/508,376

(22) Filed: Oct. 7, 2014

(65) Prior Publication Data
US 2015/0098036 A1 Apr. 9, 2015

(30) Foreign Application Priority Data
Oct. 8, 2013 (JP) .................................. 2013-211329

(51) Int. Cl.
*G02F 1/1345* (2006.01)

(52) U.S. Cl.
CPC ....... *G02F 1/13458* (2013.01); *G02F 1/13452* (2013.01)

(58) Field of Classification Search
CPC .......................... G02F 1/13452; G02F 1/13458
USPC ................................................. 349/150–152
See application file for complete search history.

(56) References Cited

U.S. PATENT DOCUMENTS

| 6,297,868 B1 * | 10/2001 | Takenaka ............ G02F 1/13452 349/151 |
| 2002/0080318 A1 * | 6/2002 | Yamate ................. G02F 1/1345 349/149 |
| 2008/0123041 A1 * | 5/2008 | Fujita ..................... H05K 3/323 349/152 |

FOREIGN PATENT DOCUMENTS

JP 2012-227480 A 11/2012

* cited by examiner

*Primary Examiner* — Thanh-Nhan P Nguyen
(74) *Attorney, Agent, or Firm* — Typha IP LLC

(57) ABSTRACT

Provided is a display device making it possible to reduce or prevent occurrence of an inter-bump short circuit and a short circuit between a terminal and a bump even when the number of conductive particles in an ACF is large. The display device includes a display panel and a driver IC connected to the display panel via the ACF. The driver IC includes an input side bump and an output side bump and has a flow acceleration member on the upstream side of the output side bump relative to a flow direction of the ACF conductive particles when heating and pressurizing the ACF.

13 Claims, 3 Drawing Sheets

DISPLAY DEVICE

CLAIM OF PRIORITY

The present application claims priority from Japanese patent application JP 2013-211329 filed on Oct. 8, 2013 the content of which is hereby incorporated by reference into this application.

BACKGROUND OF THE INVENTION

Field of the Invention

The present invention relates to a display device.

Description of the Related Art

Display devices are widely used in display units of various types of electronic equipment such as cell phones, digital cameras and so forth. A liquid crystal display device that is one type of the display device includes a liquid crystal display (LCD) panel and a driver IC with a circuit for driving and controlling the LCD panel loaded thereon.

The LCD panel has a configuration that liquid crystals are sealed between a TFT substrate (a glass substrate) with a thin film transistor (TFT) and so forth formed thereon and a CF substrate with a color filter (CF) and so forth formed thereon. In such an LCD panel, a COG (Chip On Glass) of implementing a naked driver IC (a not-packaged IC) directly onto the TFT substrate with wiring formed thereon is adopted. As a method of implementing an IC chip in this COG, for example, a method of using an anisotropic conductive film called an ACF (Anisotropic Conductive Film) is known. In implementation of the IC chip by using this ACF, a connection unit (an LCD terminal) configured by part of the wiring formed on the TFT substrate and a bump formed on a circuit formation surface (a main surface) of the driver IC are electrically and mechanically connected together via conductive particles in the ACF by heating and pressurizing the ACF by using a compression bonding head. As the ACF, for example, a sheet-shaped film that contains an epoxy-based thermosetting insulating resin and many conductive particles is used. The liquid crystal display device of the COG system using the ACF is described, for example, in Japanese Patent Application Laid-Open Publication No. 2012-227480.

SUMMARY OF THE INVENTION

A circuit is deposited onto one surface of the driver IC and bumps are arranged on the input and output sides of the driver IC for use in connection with the LCD terminal. In the display device, it is necessary to increase the number of the bumps on the output side of the driver IC in order to cope with high resolution and, in association therewith, it becomes necessary to reduce a bump area per bump and an inter-bump dimension and to increase the number of the conductive particles in the ACF in order to assure connection reliability. Accordingly, the inventors of the present invention have examined matters to be solved in connection of the driver IC to the TFT substrate in a liquid crystal display device of a configuration so made as to meet the above-mentioned requirements in anticipation of future products.

FIG. 2 is an explanatory diagram illustrating one example of a thermo compression bonding method for connecting the driver IC to the TFT substrate using the ACF. An LCD panel 100 and a driver IC 120 are arranged under a compression bonding tool 300 via an ACF 130. When the driver IC 120 is to be heated and pressurized by the compression bonding tool 300, a cushioned Teflon (a registered trademark) sheet that makes it possible to prevent adhesion of the ACF 130 to the compression bonding tool 300 and contamination of the driver IC 120 is inserted between the compression bonding tool 300 and the driver IC 120 as a buffer material 310. The buffer material (the Teflon sheet) 310 has a thickness of about 0.03 mm to about 0.1 mm.

Sectional diagrams taken along the a-a' line in FIG. 2 are illustrated in FIG. 3. An LCD terminal 105 is formed on a part of a TFT substrate (a glass substrate) of the LCD panel 100, a gold (Au) bump 121 is formed under the driver IC 120 and the ACF 130 that contains an ACF adhesive layer 131 and many ACF conductive particles 132 is arranged between the LCD panel 100 and the driver IC 120 (the left-side drawing in FIG. 3).

The compression boding head 301 is moved downward from the above-mentioned state via the Teflon sheet 310 (the right-side drawing in FIG. 3). Thereby, the ACF conductive particles 132 are crushed between the LCD terminal 105 and the bump 121 of the driver IC 120 and electric conduction is attained. About ten conductive particles 132 are sandwiched between the LCD terminal 105 and the bump 121. In addition, since the ACE adhesive layer 131 is thermoset, the ACF 130 is maintained in a state that it has been pressurized and the driver IC 120 is fixed to the LCD panel 100. Incidentally, an insulating film 106 is deposited between the LCD terminals 105 for corrosion protection of the wiring.

FIG. 1A illustrates one example of the external appearance of the LCD panel 100 so produced. A display area 110 occupies most of the LCD panel 100. A terminal area is formed mainly on its one side (here, an upper end portion) and the driver IC 120 and an FPC (Flexible Printed Circuit) 200 are implemented in this terminal area. Power and signals are supplied to the FPC 200 to drive the LCD panel 100, thereby making the LCD panel 100 display a screen thereon. However, on the LCD panel 100, there have been observed such phenomena that a line defect 111 that lines appear vertically or horizontally occurs as illustrated in FIG. 1B and the entire of the display screen is abnormally displayed (or hidden) 112 as illustrated in FIG. 1C in some cases. When a short circuit has occurred between the adjacent bumps 121 of the driver IC 120 due to dense gathering of the conductive particles in the ACF 130, the line defect that two vertical or horizontal lines appear in the display screen occurs and hiding of the entire screen or the abnormal screen also occurs depending on the positions of the bumps.

The present invention aims to provide a display device making it possible to reduce or prevent occurrence of the inter-bump short circuit and the short circuit between the terminal and the bump even when the number of the conductive particles in the ACF is large.

In order to address the above-mentioned disadvantages, according to one embodiment of the present invention, there is provided a display device including a display panel and a driver IC connected to the display panel via an anisotropic conductive film, wherein the driver IC includes an input side bump and an output side bump, and a fluid acceleration member is arranged on the upstream side of the output side bump relative to a flow when heating and pressurizing the anisotropic conductive film.

According to another embodiment of the present invention, there is provided a display device including a display panel and a rectangular driver IC connected to the display panel via an anisotropic conductive film, wherein the driver IC includes an input side bump and an output side bump along mutually facing long sides, and a flow acceleration member is arranged on the upstream side of the output side bump relative to a flow when heating and pressurizing the anisotropic conductive film and is high enough to assure a distance that is at least a particle size of conductive particles in the anisotropic conductive film between the driver IC and the display panel.

According to the embodiments of the present invention, it is possible to provide the display device making it possible to reduce or prevent occurrence of the inter-bump short circuit and the short circuit between the terminal and the bump even when the number of the conductive particles in the ACF is large.

DETAILED DESCRIPTION OF THE PREFERRED EMBODIMENTS

Figure 1A:
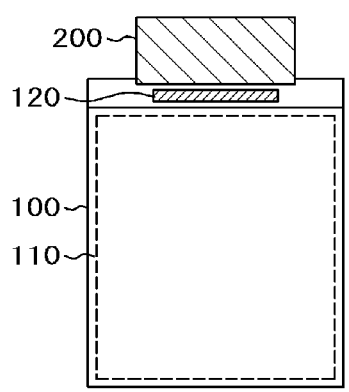
FIG. 1A is an explanatory diagram, that is, a schematic plan view illustrating one example of the external appearance of an LCD panel of a liquid crystal display device that the inventors of the present invention have examined.
Figure 1B:
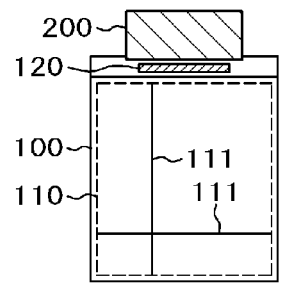
FIG. 1B is a diagram illustrating one example of a display defect occurred on the LCD panel illustrated in FIG. 1A.
Figure 1C:
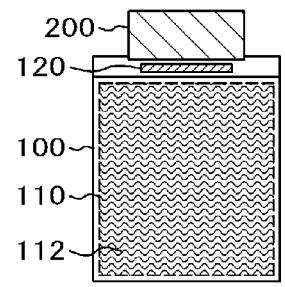
FIG. 1C is a diagram illustrating another example of the display defect occurred on the LCD panel illustrated in FIG. 1A.
Figure 2:
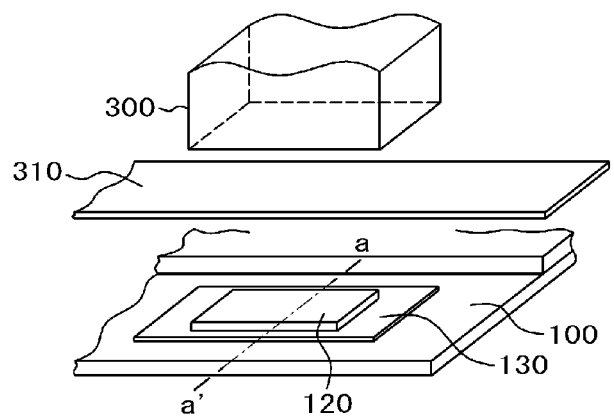
FIG. 2 is an explanatory diagram illustrating one example of a general thermo compression bonding method to be performed in order to connect a driver IC to a TFT substrate using an ACF.
Figure 3:
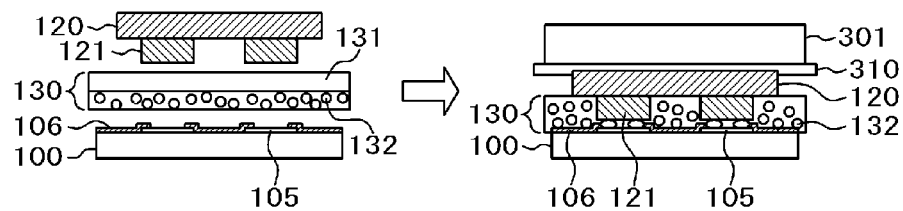
FIG. 3 is a sectional diagram taken along the a-a' line in FIG. 2, illustrating one example of a state before thermo compression bonding is performed (left side), and illustrating one example of a state that the thermo compression bonding is being performed (right side)

The inventors of the present invention have examined a cause for occurrence of the line defect illustrated in FIG. 1B and the display abnormality of the entire of the display screen illustrated in FIG. 1C by using the configuration made such that the number of the bumps on the driver IC output side is increased, the bump area per bump and the inter-bump dimension are reduced, the number of conductive particles in the ACF is increased and so forth in anticipation of future products. As a result, it was found that the principal cause for occurrence of the display abnormality lies in the point that the ACF conductive particles stay and densely gather among the output side bumps that have been formed along the long-side sides of the driver IC. In the following, description will be made in detail.

Figure 4:
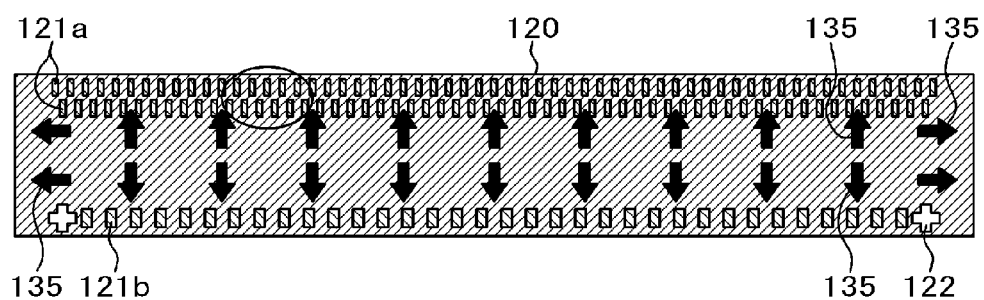
FIG. 4 is a diagram illustrating one arrangement example of bumps of the driver IC and explaining an ACF flow direction.
Figure 5:
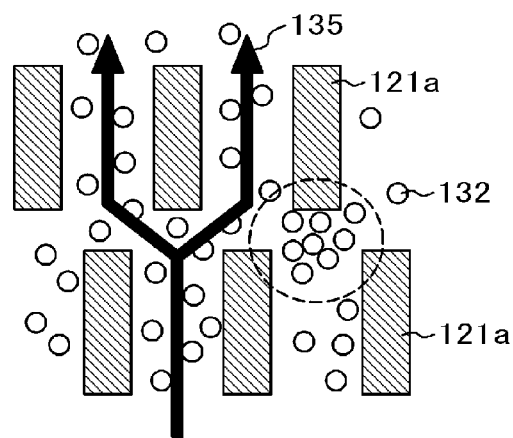
FIG. 5 is a diagram explaining one example of a situation that ACF conductive particles stay among bump parts of the driver IC.

A distance between the LCD panel 100 and the driver IC 120 when the LCD panel 100 and the driver IC 120 have been connected together is about 12 μm to about 15 μm. On the other hand, a thickness of the ACF 130 is initially about 20 μm to about 25 μm and some of the conductive particles in the ACF 130 flow out through between the LCD panel 100 and the driver IC 120 when the driver IC 120 is pressurized against the LCD panel 100 via the ACF 130 by using a compression bonding tool. A flow of the conductive particles in the ACF 130 will be described by using FIG. 4. Output side bumps 121a and input side bumps 121b of the driver IC 120 are arranged in the vicinity of end faces on the long-side sides thereof. Since the number of the bumps, in particular, of the output side bumps 121a is increased, the bumps are arranged in plural arrays (here, two arrays) in a zigzag form and a distance between the adjacent bumps is reduced. Incidentally, 122 denotes an alignment mark. When the driver IC 120 is heated and pressurized against the LCD panel 100 by the compression bonding tool, the ACF 130 is discharged through a central part of the driver IC 120 toward an outward direction 135 and also useless conductive particles not used for connection in the ACF 130 flow toward an end of the driver IC 120. FIG. 5 is an enlarged schematic diagram illustrating one example of a part circled with a solid line in FIG. 4. It has been found that ACF conductive particles 132 that have flown toward the end of the driver IC 120 flow among the output side bumps 121a in the outward direction 135, stay and densely gather (a part circled with a broken line, about 30 particles) among the output side bumps 121a that are arrayed in the zigzag form so as to cope with a narrow pitch to sometimes induce a short circuit. The present invention has been made on the basis of the above-mentioned knowledge. An embodiment of the present invention is configured such that a flow acceleration member such as, for example, a triangular or V-shaped step and so forth is arranged on the upstream side (the inlet side) of the bump relative to the flow of the ACF conductive particles 132 so as to improve the fluidity of the ACF conductive particles 132, thereby reducing or preventing dense gathering of the ACF conductive particles 132. It is desirable that the flow acceleration member be formed such that a leading end thereof on the upstream side has an acute angle. Incidentally, when the flow acceleration member was formed into a semi-circular shape, no advantageous effect was obtained.

In the following, the present invention will be described in detail with reference to preferred embodiments. Incidentally, although description will be made by giving a liquid crystal display device by way of example in the present embodiments, the present invention is not limited to it. In addition, in description of the embodiments, the same numerals denote the same constitutional elements.

First Embodiment

Figure 6:
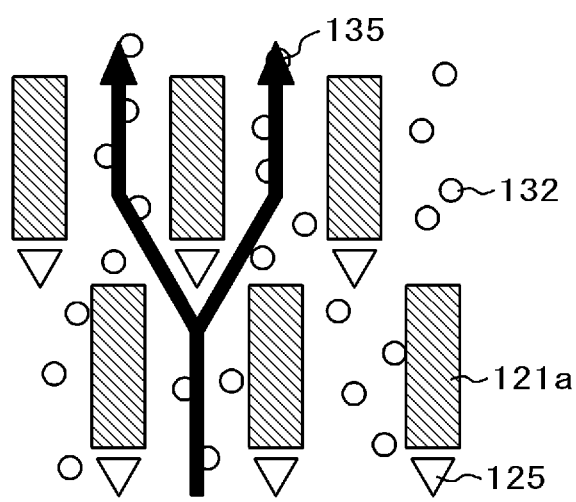
FIG. 6 is a schematic plan view illustrating one example of a main part in a liquid crystal display device according to a first embodiment of the present invention.

A first embodiment of the present invention will be described by using FIG. 6. In the present embodiment, an example that the flow acceleration member is provided on the LCD panel side will be described. The LCD terminal 105 is provided on the LCD panel 100 and the insulating film (a passivation film: PAS) 106 that covers an end thereof is processed to form a flow acceleration member (an inlet side step) 125. The flow acceleration member (the inlet side step) 125 is formed such that when the LCD panel 100 is viewed vertically from above as illustrated in FIG. 6, a corner of the member 125 that is in the form of an equilateral triangle is opposite to the flow direction and a length of its base is smaller than a width of the output side bump 121a. As an alternative, the flow acceleration member 125 may be in the form of an isosceles triangle whose height exceeds the length of its base. When the liquid crystal display device is produced so as to be about 10 μm to 15 μm in height of the output side bump 121a, about 2 μm to about 3 μm in height of the flow acceleration member (the inlet side step) 125 and about 3.5 μm in particle size of the ACF conductive particle 132, it is possible to improve the fluidity of the conductive particles 132 in the ACF 130 to reduce or prevent staying of the ACF conductive particles 132 among the output side bumps 121a, thereby to reduce occurrence of a short circuit failure caused by dense gathering. Incidentally, although in the present invention, the flow acceleration members (the inlet side steps) 125 are arranged on the upstream sides (the upstream sides relative to the flow direction of the ACF 130 when heating and pressurizing the driver IC 120 by the compression bonding tool) of the output side bumps 121a in all arrays, when a plurality of arrays of the output side bumps 121a are present, arrangement of the flow acceleration members 125 for the output side bumps 121a arrayed on the innermost side (the uppermost stream side) may be eliminated. In addition, the flow acceleration members 125 may be also arranged on the upstream sides of the input side bumps 121b. In addition, it becomes unnecessary to increase the number of manufacturing steps by using the passivation film 106 as the flow acceleration member (the inlet side step) 125 and thus it is possible to suppress an increase in manufacturing cost.

According to the present embodiment, it is possible to provide the display device making it possible to reduce or prevent occurrence of the inter-bump short circuit and the short circuit between the terminal and the bump even when the number of the conductive particles in the ACF is large. In addition, it is possible to suppress the increase in manufacturing cost.

Second Embodiment

A second embodiment of the present invention will be described. Also in the present embodiment, an example that the flow acceleration member 125 is provided on the LCD panel side similarly to the first embodiment will be described. The LCD terminal 105 is provided on the LCD panel 100 and the insulating film (the passivation film: PAS) 106 that covers the end thereof is processed to form the flow acceleration member (the inlet side step) 125. The flow acceleration member (the inlet side step) 125 is formed such that a corner of the member 125 that is in the form of a V-shape is opposite to the flow direction and a length of its base is smaller than the width of the output side bump 121a. When the liquid crystal display device is produced so as to be about 10 μm to 15 μm in height of the output side bump 121a, about 2 μm to about 3 μm in height of the flow acceleration member (the inlet side step) 125 and about 3.5 μm in particle size of the ACF conductive particle 132, it is possible to improve the fluidity of the conductive particles 132 in the ACF 130 to reduce or prevent staying of the ACF conductive particles 132 among the output side bumps 121a, thereby to reduce occurrence of the short circuit failure caused by dense gathering. Incidentally, although, in the present invention, the flow acceleration members (the inlet side steps) 125 are arranged on the upstream sides (the upstream sides relative to the flow direction of the ACF 130 when heating and pressurizing the driver IC 120 by the compression bonding tool) of the output side bumps 121a in all arrays, when the plurality of arrays of the output side bumps 121a are present, arrangement of the flow acceleration members 125 for the output side bumps 121a arrayed on the innermost side (the uppermost stream side) may be eliminated. In addition, the flow acceleration members 125 may be also arranged on the upstream sides of the input side bumps 121b. In addition, it becomes unnecessary to increase the number of manufacturing steps by using the PAS film 106 as the flow acceleration member (the inlet side step) 125 and thus it is possible to suppress the increase in manufacturing cost.

According to the present embodiment, it is possible to provide the display device making it possible to reduce or prevent occurrence of the inter-bump short circuit and the short circuit between the terminal and the bump even when the number of the conductive particles in the ACF is large. In addition, it is possible to suppress the increase in manufacturing cost.

Third Embodiment

A third embodiment of the present invention will be described. Also in the present embodiment, an example that the flow acceleration member 125 is provided on the LCD panel side similarly to the first embodiment will be described. The LCD terminal 105 is provided on the LCD panel 100 and another insulating film is formed on the insulating film (the passivation film: PAS) 106 that covers the end thereof and is processed to form the flow acceleration member (the inlet side step) 125. The flow acceleration member (the inlet side step) 125 is formed such that a corner of the member 125 that is in the form of a triangle is opposite to the flow direction and a length of its base is smaller than the width of the output side bump 121a. As an alternative, the flow acceleration member 125 may be in the form of an isosceles triangle whose height exceeds the length of its base. Incidentally, when an insulating film is to be newly formed, the flow acceleration member 125 may be arranged not on the LCD panel side but on the driver IC side. In addition, although the advantageous effect may be attained as long as the height of the flow acceleration member 125 is at least a half of the conductive particle size, it is desirable that the height of the flow acceleration member 125 be at least the conductive particle size.

When the liquid crystal display device is produced so as to be about 10 μm to 15 μm in height of the output side bump 121a and about 3.5 μm in particle size of the ACF conductive particle 132 and so as to set the height of the flow acceleration member (the inlet side step) 125 to a height (about 6.5 μm to about 11.5 μm or not more than 11.5 μm. Here, about 6.5 μm) that the conductive particles 132 in the ACF 130 are not sandwiched between the driver IC 120 and the LCD panel 100, it is possible to improve the fluidity of the conductive particles 132 in the ACF 130 to reduce or prevent staying of the ACF conductive particles 132 among the output side bumps 121a, thereby to reduce occurrence of the short circuit failure caused by dense gathering. Incidentally, although in the present invention, the flow acceleration members (the inlet side steps) 125 are arranged on the upstream sides (the upstream sides relative to the flow direction of the ACF 130 when heating and pressurizing the driver IC 120 by the compression bonding tool) of the output side bumps 121a in all arrays, when the plurality of arrays of the output side bumps 121a are present, arrangement of the flow acceleration members 125 for the output side bumps 121a arrayed on the innermost side (the uppermost stream side) may be eliminated. In addition, the flow acceleration members 125 may be also arranged on the upstream sides of the input side bumps 121b.

According to the present embodiment, it is possible to provide the display device making it possible to reduce or prevent occurrence of the inter-bump short circuit and the short circuit between the terminal and the bump even when the number of the conductive particles in the ACF is large. In addition, it is possible to suppress the increase in manufacturing cost.

Fourth Embodiment

A fourth embodiment of the present invention will be described. Also in the present embodiment, an example that the flow acceleration member 125 is provided on the LCD panel side similarly to the first embodiment will be described. The LCD terminal 105 is provided on the LCD panel 100 and another insulating film is formed on the insulating film (the passivation film: PAS) 106 that covers the end thereof and is processed to form the flow acceleration member (the inlet side step) 125. The flow acceleration member (the inlet side step) 125 is formed such that a corner of the member 125 that is in the form of a V-shape is opposite to the flow direction and a length of its base is smaller than the width of the output side bump 121a. Incidentally, when an insulating film is to be newly formed, the flow acceleration member 125 may be arranged not on the LCD panel side but on the driver IC side. In addition, although the advantageous effect may be attained as long as the height of the flow acceleration member 125 is at least a half of the conductive particle size, it is desirable that the height of the flow acceleration member 125 be at least the conductive particle size.

When the liquid crystal display device is produced so as to be about 10 μm to 15 μm in height of the output side bump 121a and about 3.5 μm in particle size of the ACF conductive particle 132 and so as to set the height of the flow acceleration member (the inlet side step) 125 to a height (about 6.5 μm to about 11.5 μm or not more than 11.5 μm. Here, about 6.5 μm) that the conductive particles 132 in the ACF 130 are not sandwiched between the driver IC 120 and the LCD panel 100, it is possible to improve the fluidity of the conductive particles 132 in the ACF 130 to reduce or prevent staying of the ACF conductive particles 132 among the output side bumps 121a, thereby to reduce occurrence of the short circuit failure caused by dense gathering. Incidentally, although in the present invention, the flow acceleration members (the inlet side steps) 125 are arranged on the upstream sides (the upstream sides relative to the flow direction of the ACF when heating and pressurizing the driver IC 120 by the compression bonding tool) of the output side bumps 121a in all arrays, when the plurality of arrays of the output side bumps 121a are present, arrangement of the flow acceleration members 125 for the output side bumps 121a arrayed on the innermost side (the uppermost stream side) may be eliminated. In addition, the flow acceleration members 125 may be also arranged on the upstream sides of the input side bumps 121b.

According to the present embodiment, it is possible to provide the display device making it possible to reduce or prevent occurrence of the inter-bump short circuit and the short circuit between the terminal and the bump even when the number of the conductive particles 132 in the ACF 130 is large. In addition, it is possible to suppress the increase in manufacturing cost.

Although the liquid crystal display device has been described in the foregoing, the present invention is not limited to the liquid crystal display device and it is also possible to apply the present invention to display devices in general such as an organic EL type display device and so forth. In addition, description has been made on the assumption that an organic passivation film that is also formed on the display area of the display device and whose height reaches several micrometers is used as the passivation film for the flow acceleration member, a film of the type other than the passivation type and made of an organic material, an inorganic passivation film, an interlayer insulating film and so forth may be used and a film that a conductive layer and so forth are laminated under one of the above-mentioned films may be used. Further, the flow acceleration member may be in the form of either a triangle pole or a trigonal pyramid and may be shaped such that the height is gradually increased as it goes from the apex side far from the bump toward a side close to the bump. In addition, the planar shape of the flow acceleration member may not necessarily be a triangle and may be either a circle or a polygon other than the triangle as long as acceleration of the flow of the conductive particles is made possible by the flow acceleration member. Further, the flow acceleration member may have a shape that a plurality of linear members are combined together.

Incidentally, the present invention is not limited to the above-mentioned embodiments and includes various modified examples. For example, the above-mentioned embodiments have been described in detail for ready understanding of the present invention and the present invention is not necessarily limited to those including all of the configurations described above. In addition, a part of one configuration of one embodiment may be replaced with one configuration of another embodiment. Further, one configuration of another embodiment may be added to one configuration of one embodiment. Still further, another configuration may be added to, deleted from and/or replaced with a part of one configuration of each embodiment.

What is claimed is:

1. A display device, comprising:
a display panel; and
a driver IC connected to the display panel via an anisotropic conductive film, wherein
the driver IC includes a plurality of input side bumps and a plurality of output side bumps,
the plurality of output side bumps form two rows in a first direction and are arranged in a zigzag form,
a flow path extends along the first direction and is formed between the two rows,
a flow acceleration member is arranged on an upstream side of at least one of the output side bumps relative to a flow when heating and pressurizing the anisotropic conductive film, and
the flow acceleration member is formed in the flow path, made of a passivation film, and separated from each of the output side bumps.

2. The display device according to claim 1, wherein the flow acceleration member is provided on the display panel.

3. The display device according to claim 2, wherein the flow acceleration member is in the form of a triangle having a corner on the upstream side when viewing the display panel vertically from above.

4. The display device according to claim 3, wherein the triangle is an equilateral triangle.

5. The display device according to claim 2, wherein the flow acceleration member is arranged for each of the output side bumps of the two rows.

6. The display device according to claim 5, wherein the flow acceleration member is provided on the upstream side of at least one of the input side bumps relative to the flow when heating and pressurizing the anisotropic conductive film.

7. The display device according to claim 2, wherein the flow acceleration member is in the form of a V-shape having a corner on the upstream side when viewing the display panel vertically from above.

8. A display device, comprising:
a display panel; and
a rectangular driver IC connected to the display panel via an anisotropic conductive film, wherein
the driver IC includes a plurality of input side bumps and a plurality of output side bumps along mutually facing long sides,
the plurality of output bumps form two rows in a first direction and are arranged in zigzag form,
a flow path extends along the first direction and is formed between the two rows,
a flow acceleration member is arranged on an upstream side of at least one of the output side bumps relative to a flow when heating and pressurizing the anisotropic conductive film and is high enough to assure a distance that is at least a particle size of conductive particles in the anisotropic conductive film between the flow acceleration member and the driver IC, and
the flow acceleration member is formed in the flow path, made of a passivation film, and separated from each of the output side bumps.

9. The display device according to claim 8, wherein the flow acceleration member is in the form of a triangle having a corner on the upstream side when viewing the display panel vertically from above.

10. The display device according to claim 8, wherein the flow acceleration member is in the form of a V-shape having a corner on the upstream side when viewing the display panel vertically from above.

11. A display device, comprising:
a display panel; and
a rectangular driver IC connected to the display panel via an anisotropic conductive film, wherein
the driver IC includes a plurality of input side bump and a plurality of output side bumps along mutually facing long sides,
a flow path extends along the first direction and is formed between the two rows,
a flow acceleration member is arranged on an upstream side of at least one of the output side bumps relative to a flow when heating and pressurizing the anisotropic conductive film and is high enough to assure a distance that is at least a particle size of conductive particles in the anisotropic conductive film between the flow acceleration member and the display panel, and
the flow acceleration member is formed in the flow path, made of an insulating film, and separated from each of the output side bumps.

12. The display device according to claim 11, wherein the flow acceleration member is in the form of a triangle having a corner on the upstream side when viewing the display panel vertically from above.

13. The display device according to claim 11, wherein the flow acceleration member is in the form of a V-shape having a corner on the upstream side when viewing the display panel vertically from above.

* * * * *